(12) United States Patent
Atkins et al.

(10) Patent No.: US 12,307,317 B2
(45) Date of Patent: *May 20, 2025

(54) TRANSACTION CARD ASSEMBLY

(71) Applicant: Capital One Services, LLC, McLean, VA (US)

(72) Inventors: Phoebe Atkins, Midlothian, VA (US); Vyjayanthi Vadrevu, Pflugerville, TX (US); Michael Saia, Weehawken, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,421

(22) Filed: Nov. 29, 2023

(65) Prior Publication Data

US 2024/0160886 A1 May 16, 2024

Related U.S. Application Data

(63) Continuation-in-part of application No. 17/539,633, filed on Dec. 1, 2021, now Pat. No. 11,868,833, and a continuation-in-part of application No. 17/539,636, filed on Dec. 1, 2021, now Pat. No. 11,893,573.

(51) Int. Cl.
*G06K 19/077* (2006.01)
(52) U.S. Cl.
CPC .............. *G06K 19/07773* (2013.01)
(58) Field of Classification Search
None
See application file for complete search history.

(56) References Cited

U.S. PATENT DOCUMENTS

| | | | |
|---|---|---|---|
| 3,583,317 A | 6/1971 | Gibson | |
| 5,936,227 A | 8/1999 | Truggelmann et al. | |
| 6,087,954 A | 7/2000 | McSpadden et al. | |
| 6,121,544 A * | 9/2000 | Petsinger | G06K 19/005 150/147 |
| D443,298 S | 6/2001 | Webb et al. | |
| 6,561,432 B1 | 5/2003 | Vedder et al. | |
| 6,685,097 B1 | 2/2004 | Housse | |

(Continued)

OTHER PUBLICATIONS

Nadine Salcman "Transparent Credit Card" Rewire Blog https://www.rewire.com/blog/2019//11/06/transparent-credit-card/ pp. 1-3, Nov. 6, 2019.

(Continued)

*Primary Examiner* — Kristy A Haupt
(74) *Attorney, Agent, or Firm* — Banner & Witcoff, Ltd.

(57) ABSTRACT

A modular transaction card assembly includes a card frame having the traditional dimensions of a credit card, and a transaction card that is smaller than a traditional card and that fits into a receptacle of the card frame. Each of the card frame and the transaction card may be capable of performing contactless data transactions individually. The combined assembly of the card frame with the transaction card secured in the receptacle is also capable of performing contact data transactions, and in some instances, with an identifier that is distinct from the card frame or the transaction card alone. The card frame may include a processor enabling it to perform data encryption and authentication of the smaller transaction card.

20 Claims, 12 Drawing Sheets

(56) References Cited

U.S. PATENT DOCUMENTS

| | | |
|---|---|---|
| D490,104 S | 5/2004 | Lubking |
| D493,195 S | 7/2004 | Creighton |
| 6,767,232 B1 | 7/2004 | Tien |
| D498,788 S | 11/2004 | Lubking |
| D511,543 S | 11/2005 | Lubking |
| 6,964,377 B1 | 11/2005 | Haghiri et al. |
| 6,986,465 B2 | 1/2006 | Kiekhaefer |
| 6,987,975 B1 | 1/2006 | Irvin et al. |
| D522,052 S | 5/2006 | Lubking |
| D530,741 S | 10/2006 | Blossom |
| 7,134,603 B2 | 11/2006 | Batoha |
| 7,384,000 B2 | 6/2008 | Anders et al. |
| 7,575,153 B2 | 8/2009 | Wisniewski et al. |
| 7,673,805 B2 | 3/2010 | Onishi et al. |
| D643,062 S | 8/2011 | Skelding et al. |
| 8,328,106 B1 | 12/2012 | Trujillo |
| D677,330 S | 3/2013 | Blum |
| 8,434,680 B1 | 5/2013 | Schultz et al. |
| 8,456,852 B2 | 6/2013 | Xiao et al. |
| D687,095 S | 7/2013 | Mullen et al. |
| D687,887 S | 8/2013 | Mullen et al. |
| D694,322 S | 11/2013 | Mullen et al. |
| 8,573,986 B2 | 11/2013 | Holmes |
| 9,299,020 B2 | 3/2016 | Zimmerman et al. |
| D765,170 S | 8/2016 | Tattersall |
| D798,386 S | 9/2017 | Yoo et al. |
| 9,754,312 B2 | 9/2017 | Edwards et al. |
| D813,302 S | 3/2018 | Getachew et al. |
| D835,714 S | 12/2018 | Bagnell et al. |
| D861,782 S | 10/2019 | Paleczny et al. |
| 10,552,722 B2 | 2/2020 | Finn et al. |
| 10,614,449 B1 | 4/2020 | Pham et al. |
| 10,675,904 B2 | 6/2020 | Tiguy et al. |
| 10,817,868 B1 | 10/2020 | Marsch et al. |
| 10,824,931 B2 | 11/2020 | Finn et al. |
| 11,030,509 B1 | 6/2021 | Johnson et al. |
| 11,328,195 B2 | 5/2022 | Montealegre et al. |
| D977,565 S | 2/2023 | Meraz et al. |
| 11,587,063 B1 | 2/2023 | Buentello et al. |
| 11,704,641 B2 | 7/2023 | Pathiyal |
| 11,755,872 B2 | 9/2023 | Coleman |
| 11,868,833 B2 * | 1/2024 | Atkins ............. G06K 19/07743 |
| 11,893,573 B2 * | 2/2024 | Atkins ............. G06K 19/07771 |
| 2004/0118930 A1 | 6/2004 | Berardi et al. |
| 2005/0046175 A1 | 3/2005 | Fox |
| 2006/0175418 A1 | 8/2006 | Ho |
| 2007/0176007 A1 | 8/2007 | Priya et al. |
| 2007/0194131 A1 | 8/2007 | Brown et al. |
| 2009/0179077 A1 * | 7/2009 | Brown ............... G06K 19/0723 235/439 |
| 2011/0278361 A1 | 11/2011 | Heusmann et al. |
| 2012/0214548 A1 | 8/2012 | Pan et al. |
| 2013/0201646 A1 | 8/2013 | Braun |
| 2013/0258605 A1 | 10/2013 | Hsu |
| 2014/0366753 A1 | 12/2014 | Meilach et al. |
| 2016/0224879 A1 | 8/2016 | Amarnath et al. |
| 2018/0068138 A1 | 3/2018 | Palermo |
| 2018/0285868 A1 | 10/2018 | O'Hara et al. |
| 2019/0034910 A1 | 1/2019 | Gardner et al. |
| 2020/0065820 A1 | 2/2020 | Scholl |
| 2020/0160135 A1 | 5/2020 | Lowe |
| 2020/0185968 A1 | 6/2020 | Kim et al. |
| 2020/0311509 A1 | 10/2020 | Benkley, III et al. |
| 2020/0410314 A1 | 12/2020 | Stahlhut et al. |
| 2021/0103919 A1 | 4/2021 | Mullen |
| 2021/0110227 A1 | 4/2021 | Harmon |
| 2021/0182650 A1 | 6/2021 | Lotya et al. |
| 2021/0279540 A1 | 9/2021 | Lloyd et al. |
| 2021/0357910 A1 | 11/2021 | Gupta |
| 2022/0134105 A1 | 5/2022 | Hvals0e et al. |
| 2022/0156711 A1 | 5/2022 | Pathiyal |
| 2022/0205334 A1 | 6/2022 | Burke et al. |
| 2022/0291462 A1 | 9/2022 | Pratap et al. |
| 2022/0400328 A1 | 12/2022 | Vandenberg et al. |
| 2023/0048029 A1 | 2/2023 | Brinkerhoff |
| 2023/0086442 A1 | 3/2023 | Van Ostrand et al. |

OTHER PUBLICATIONS

"My new credit card is transparent, so you can see the NFC coils and chip bond wires" Reddit Thread https://www.reddit.com/r/mildlyinteresting/comments/5g47ve/my_new_credit_card_is_transparent_so_you_can_see/ website visited Aug. 26, 2021.

* cited by examiner

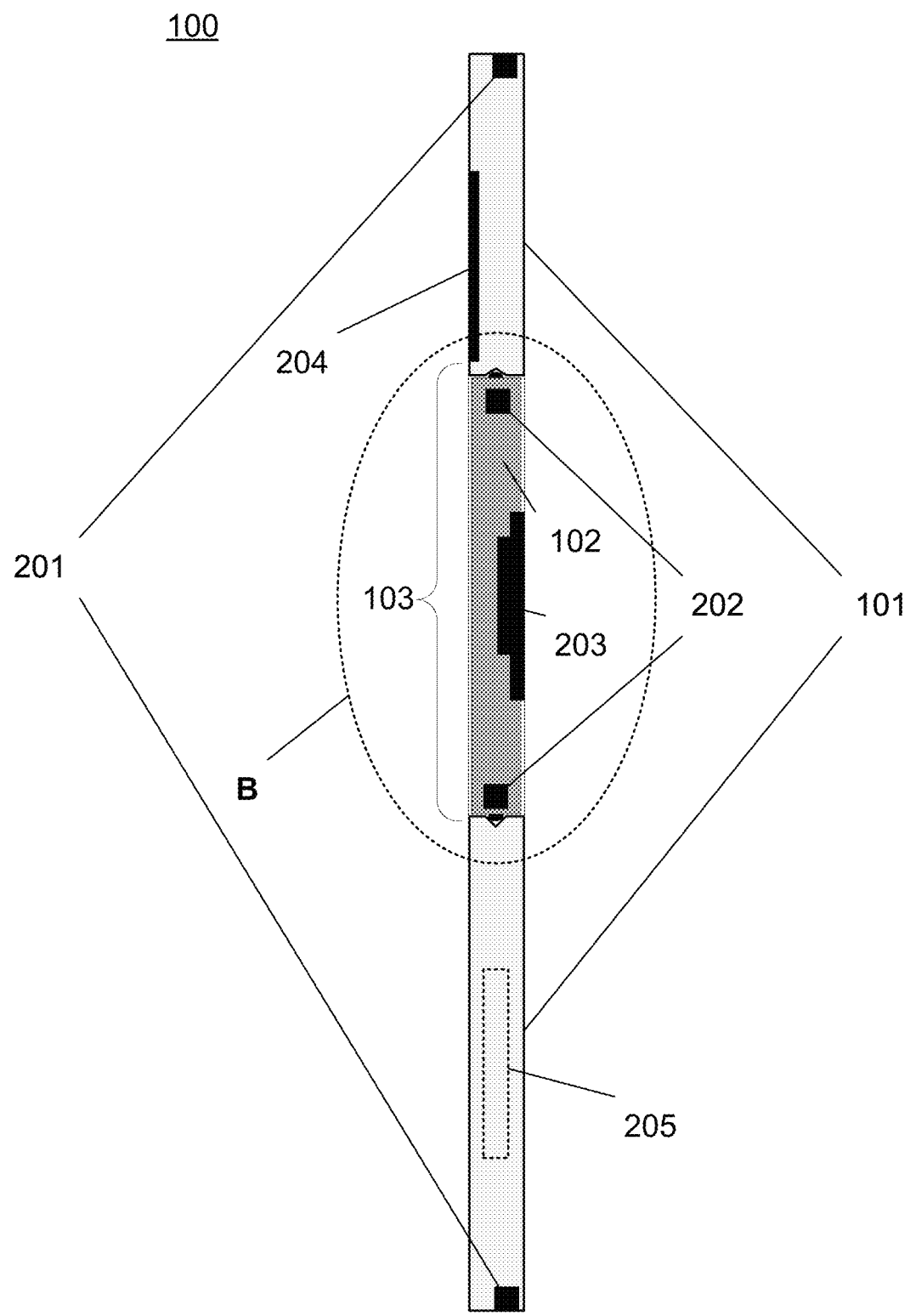
FIG. 2C  View A-A

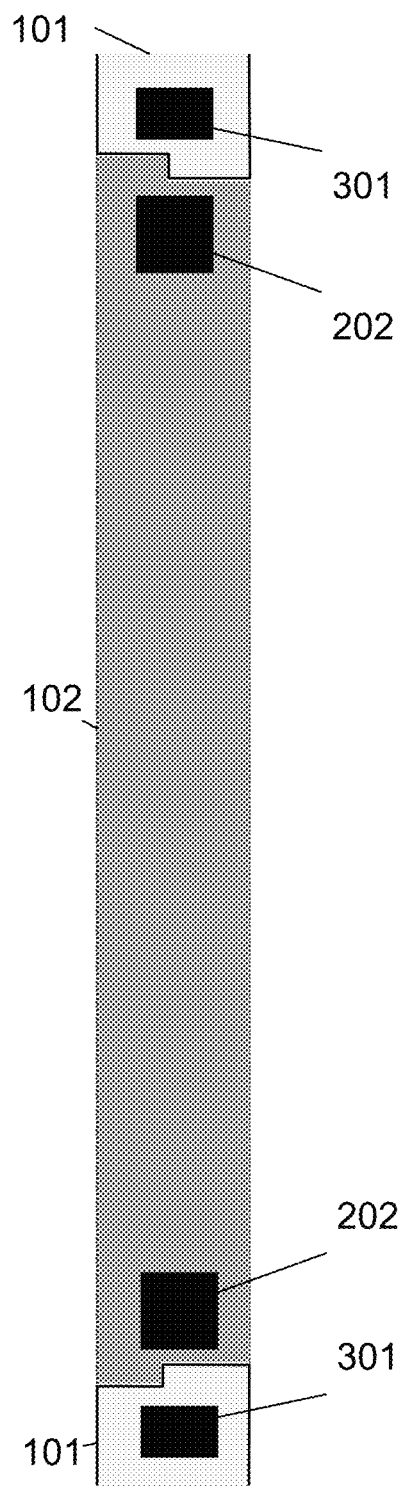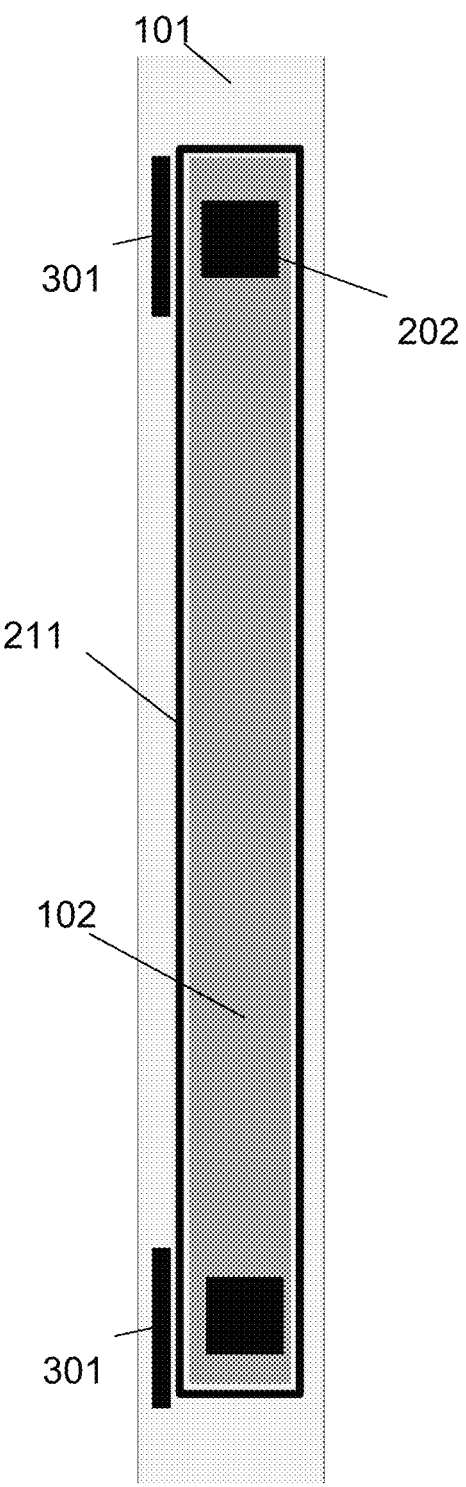
View C - C
Fig. 3C
View C - C
FIG. 3D

400

TRANSACTION CARD ASSEMBLY

CROSS-REFERENCE TO RELATED APPLICATIONS

This application is a continuation-in-part application of U.S. patent application Ser. No. 17/539,633, filed Dec. 1, 2021, and U.S. patent application Ser. No. 17/539,636, filed Dec. 1, 2021, which are incorporated in their entireties by reference herein.

FIELD OF USE

Aspects of the disclosure relate generally to transaction cards and more specifically to a modular transaction card having multiple form factors.

BACKGROUND

Transaction cards have different form factors with different capabilities. Traditional credit cards, for example, may perform transactions contactlessly, using a magnetic strip, or via a smart chip. Transaction cards in smaller form factors, such as ones with a hole punch that can be attached to a keychain, are often more convenient to carry and may have the same transaction features, but not all card readers are able to work with the smaller dimensions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

The methods, devices, systems, and/or computer-readable media disclosed herein relate to a transaction card assembly that includes a card frame having the traditional dimensions of a credit card, and a transaction card that is smaller than a traditional credit card (e.g., a "mini" transaction card). The transaction card may be capable of performing contactless data transactions (for example, credit card purchases) on its own via wireless communications, but may not be compatible with certain card readers, such as a chip reader, which accepts only a traditional credit card format. The card frame includes a receptacle that accepts and secures the transaction card and couples it to an antenna in the card frame, permitting the combined card frame and transaction card assembly to perform data transactions as a traditional form factor transaction card.

The receptacle in the card frame may have electrical contacts that mate with electrical contacts on the transaction card to couple it to the card frame antenna. In some variations, the card frame may have a second antenna that wirelessly communicates with an antenna in the transaction card when it is secured in the receptacle.

The card frame may include other features, such as electronics to provide power to the transaction card in the receptacle and may include shielding to prevent the antenna in the transaction card and the antenna in the card frame from both communicating with a card reader simultaneously.

In some variations, the card frame comprises a processing circuit for implementing a smart card frame. The processing circuit may include a computing device and memory storing computer instructions for enabling the card frame to work on its own as a transaction card without the smaller transaction card in the receptacle. The computing device may further implement authentication and cryptographic functions. For example, the card frame may authenticate the transaction card in the receptacle as a condition for completing a data transaction. The card frame may be used with multiple different transaction cards, with each combination of the card frame and different transaction cards having a unique identifier that is distinct from the identifier of each transaction card alone and different from the identifier of the card frame alone.

These features, along with many others, are discussed in greater detail below.

DESCRIPTION OF THE DRAWINGS

The present disclosure is described by way of example and not limited in the accompanying figures in which like reference numerals indicate similar elements and in which:

FIGS. 2A-2H illustrate multiple views of a transaction card assembly in accordance with one or more aspects of the disclosure;

FIGS. 3A-3D illustrate multiple views of a transaction card assembly device in accordance with one or more aspects of the disclosure;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to components, methods and techniques for a smart card system for performing contactless data transactions, the smart card system. The smart card system includes a smart card frame and one or more transaction cards. Each transaction card includes a first antenna and a first processor circuit that may perform, via the first antenna, a first contactless data transaction with a terminal. The first contactless data transaction may be based on a first secure credential stored in and unique to that transaction card. The smart card frame includes a flat sheet and a receptacle integrated in the flat sheet. The receptacle may be configured to secure, enable removal of, and resecure each of the one or more transaction cards in the smart card frame. The smart card frame may include a second antenna; and a second processor circuit integrated in the flat sheet. For each of the one or more transaction cards, the second processor circuit may be configured to generate a third secure credential based on a second secure credential stored in the smart card frame and based on the first secure credential of the transaction card. The third secure credential may be unique to the combination of the transaction card and the smart card frame. The combined smart card frame and a transaction card may then perform a second contactless data transaction with the terminal based on the third secure credential.

Figure 1:
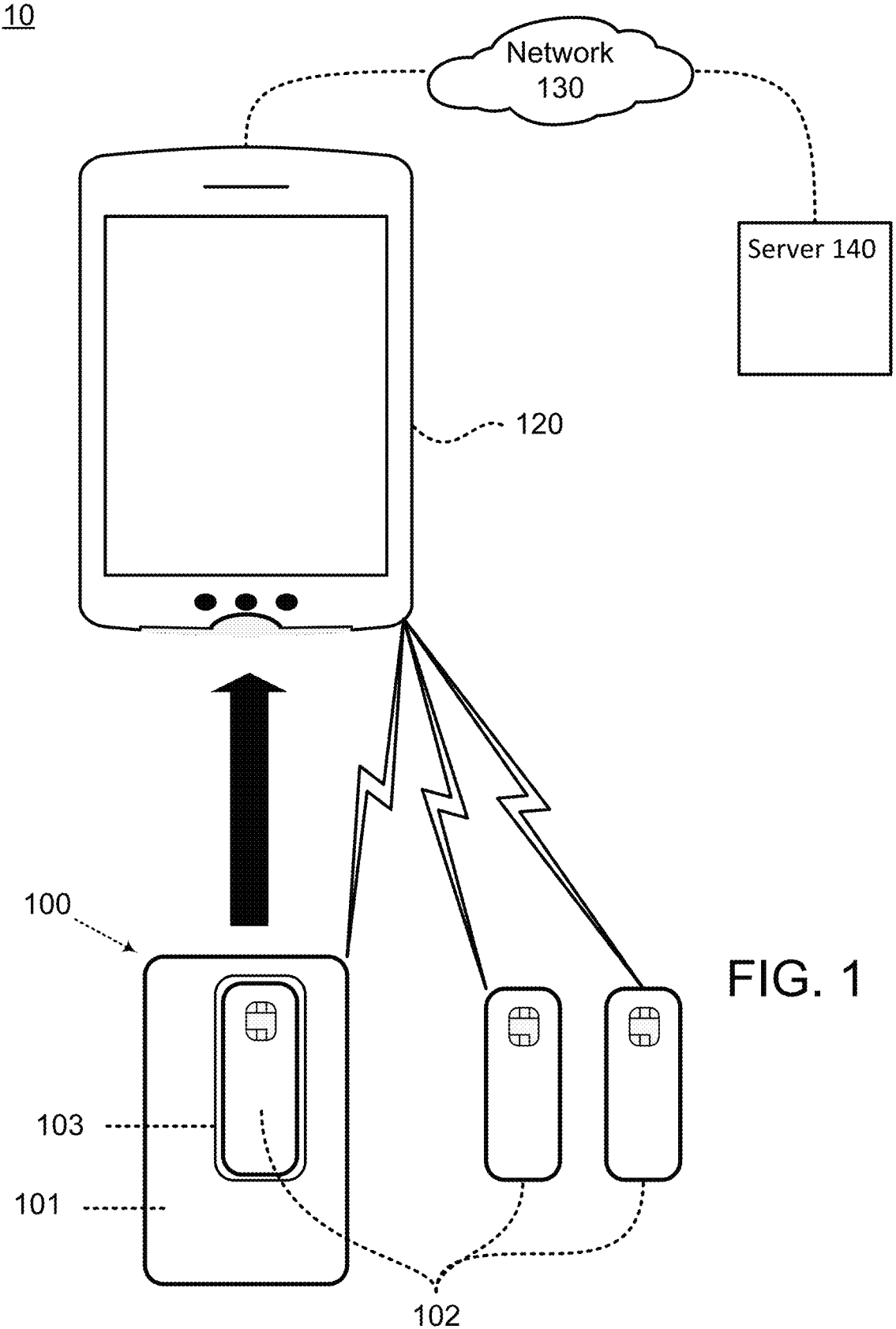
FIG. 1 illustrates a system in which a transaction card assembly may be used in accordance with one or more aspects of the disclosure.

FIG. 1 illustrates a system 10 that illustrates several components that may be found when conducting a transaction with different types of transaction cards. For example, system 10 shows a card reader 120 (e.g., a point-of-sale terminal), that may exchange data with transaction cards (e.g., 102) through a plurality of communication techniques. The card reader 120 may be communicatively coupled to a server 140 via network 130.

Card reader 120 may be any suitable card reader capable of exchanging data and/or information with transaction cards 102. In this regard, card reader 120 may be a chip-based reader, a magnetic-based reader, an EMV reader, a wireless based reader, or any combination thereof. Accordingly, card reader 120 may include a display, a keypad, a network interface and a card interface. The display may present information to the cardholder, such as the amount owed, the status of the transaction, and whether the transaction has been approved or denied. A keypad or touch screen may allow a cardholder to input a personal identification number (PIN) code, password, an amount for withdrawal, and the like. A network interface may be a wired connection, wireless connection, a short-range wireless connection, a near field communication (NFC) connection, or any combination thereof. The network interface may permit card reader 120 to communicate with server 140, via network 130, for example, to authorize a transaction. The card interface may permit card reader 120 to communicate with transaction cards 102. In these instances, card reader 120 may convey information related to the cardholder's account to transaction cards 102. Card reader 120 may be limited in the ways it can communicate with different types of transaction cards. For example, card reader 120 may have a transaction card chip reader that only works with the dimensions of a standard size credit card, but not with the dimensions of transaction card 102, which in some instances, may have smaller or non-standard dimensions (e.g., a mini-card connectable to a key ring).

Various aspects described herein, which address this compatibility issue, are directed to a card assembly 100 comprising a card frame 101 that secures a smaller transaction card 102 in a receptacle 103. In some embodiments, the card assembly 100 performs data transactions with card readers not compatible with transaction card 102, and optionally, with a unique identifier that is distinct from an identifier of transaction card 102 when the transaction card is not secured in the card frame 101.

Server 140 may be a stand-alone server, a corporate server, or a server located in a server farm or cloud-computer environment. According to some examples, server 140 may be a virtual server hosted on hardware capable of supporting a plurality of virtual servers. Server 140 may be configured to execute server-based software configured to provide cardholders with access to account information and perform routing banking functions. In some embodiments, the server-based software corresponds to client-based software executing on card reader 120.

Network 130 may be any type of communications and/or computer network. The network 130 may include any type of communication mediums and/or may be based on any type of communication standards or protocols. In this regard, network 130 may include the Internet, a local area network (LAN), a wide area network (WAN), a wireless telecommunications network, and/or any other communication network or combination thereof.

Figure 7:
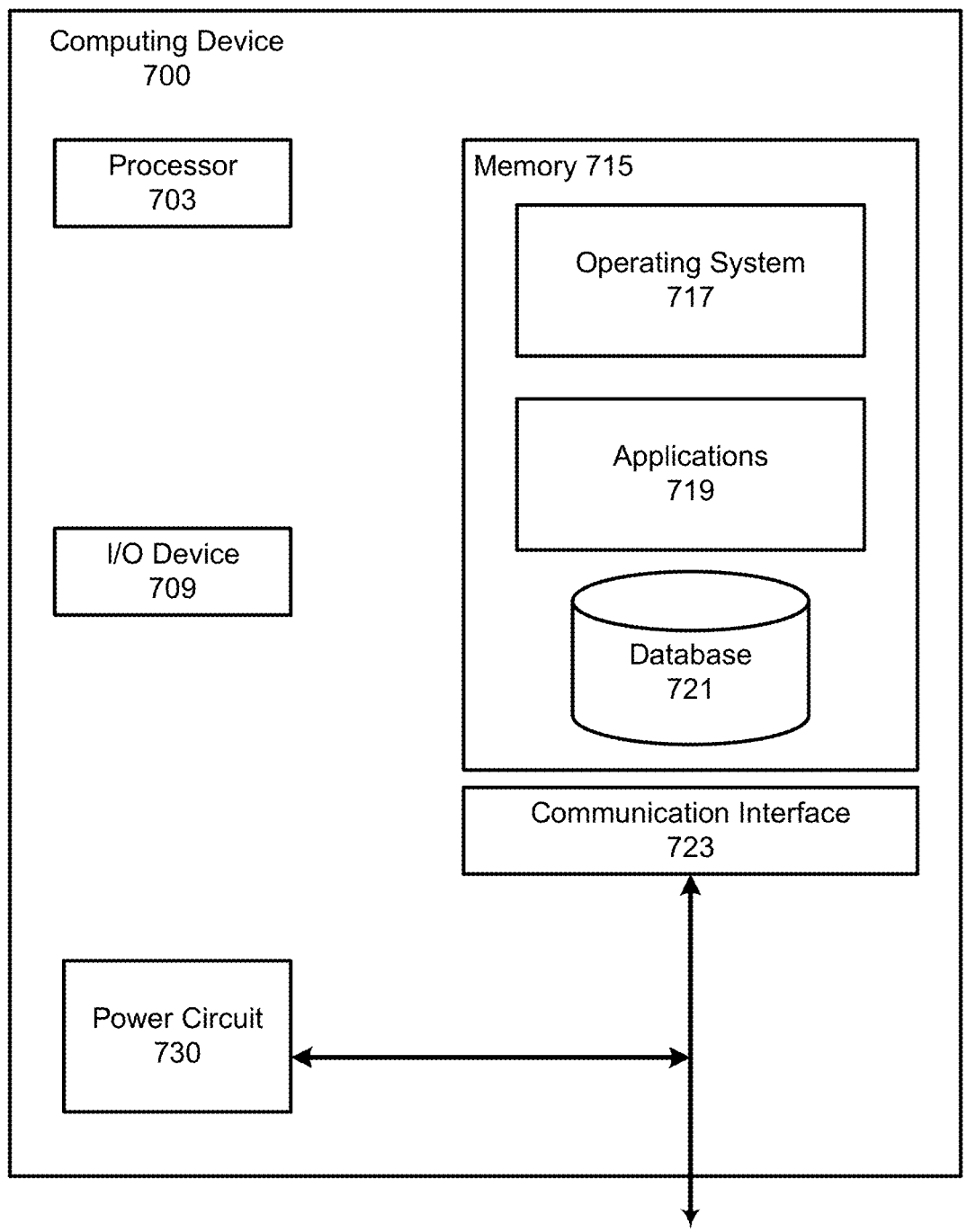
FIG. 7 illustrates a block diagram of a processing circuit according to one or more aspects of the disclosure.

Devices and systems 120, 130, and 140 in FIG. 1 may be implemented, in whole or in part, using one or more computing systems, for example, as described below with respect to FIG. 7.

Transaction card 102 and card frame 101, individually or combined as card assembly 100, may be configured to permit a cardholder to access one or more types of accounts. In this regard, transaction card 102, card frame 101, and/or card assembly 100 may behave as a credit card, a charge card, a debit card, a prepaid card, a smartcard, a payment card or an EMV card. In some embodiments, transaction card 102, card frame 101, and/or card assembly 100 may be an identification card, a club membership card, a rail pass card, or a building access card. As will be discussed in greater detail with respect to FIGS. 2 and 3, transaction card 102, card frame 101, and/or card assembly 100 may be chip-enabled and/or may include a magnetic strip. In further embodiments, transaction card 102, card frame 101, and/or card assembly 100 may include NFC capabilities, short-range wireless communication capabilities (e.g., Bluetooth®), wireless communication capabilities (e.g., Wi-Fi), or any combination thereof. The NFC capabilities, short-range wireless communication capabilities, and wireless communication capabilities may be referred to collectively as communication capabilities. These communication capabilities may permit transaction card 102, card frame 101, and/or card assembly 100 to communicate with card reader 120.

Figure 2A:
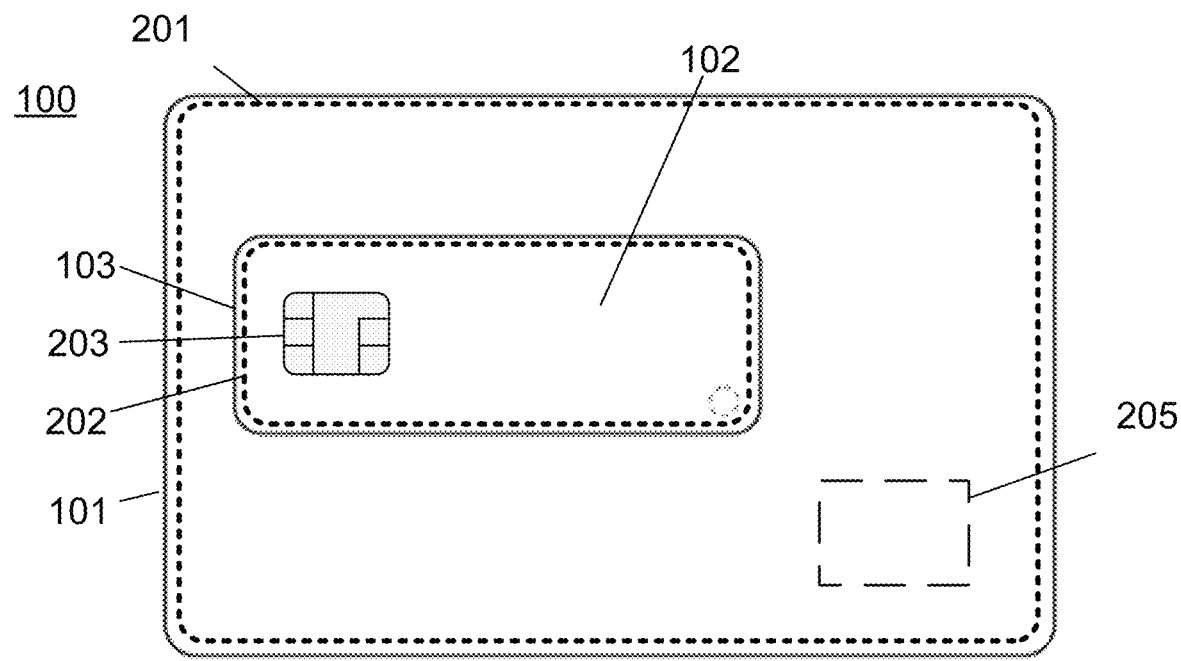
Figure 2B:
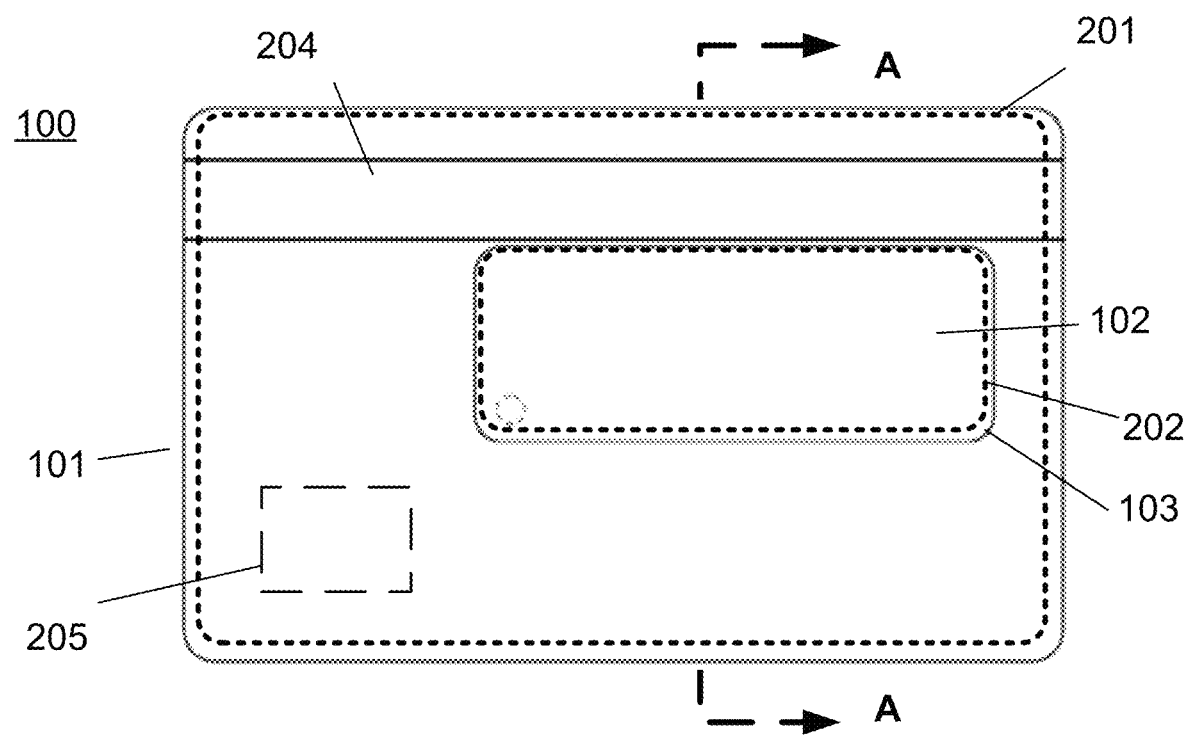

Turning to FIG. 2A-2H, various views of card assembly 100 are illustrated. As illustrated in FIGS. 2A and 2B illustrating front and back views, card frame 101 of card assembly 100 may be of a standard size and made of a suitable substrate, such as plastic, metal, etc. For example, card frame 101 may be formed as a flat sheet having a rounded rectangle perimeter. In some variations, the flat sheet is 3.361 to 3.382 inches wide, 2.119 to 2.133 inches high, and 0.027 to 0.033 inches thick.

Card frame 101 may include a magnetic strip 204 for storing data (e.g., credit card information) that may be read and written to by card reader 120, and may include an antenna 201 capable of wireless communications (e.g., NFC, Bluetooth, Wi-Fi) with another device, such as carder reader 120 in FIG. 1.

Receptacle 103 in card frame 101 may be configured to secure, permit removal of, and resecure transaction card 102. Card frame 101 may further include an electric circuit 205 for interfacing transaction card 102 to card frame antenna 201, when transaction card 102 is secured in the receptacle

103. Details of electric circuit 205 are further described below with respect to FIGS. 4 and 7.

Transaction card 102 may include a computer chip 203 and its own antenna 202 capable of wireless communications (e.g., NFC, Bluetooth, Wi-Fi) with another device, such as carder reader 120 in FIG. 1. As illustrated in the figures, antenna 202 and computer chip 203 may be embedded within transaction card 102, and may be located anywhere in the perimeter of the transaction card 102 as illustrated in FIGS. 2A and 2B, and at any depth or on either surface of the transaction card 102.

FIG. 2C illustrates a cross-sectional view A-A of FIG. 2B. As illustrated in FIG. 2C, the magnetic strip 204 may be embedded in, or on the surface of one side of, card frame 101, enabling it to be read by a magnetic strip card reader. Antenna 201 and electric circuit 205 may also be embedded in, or on the surface of one side of card frame 101. As illustrated in FIGS. 2A-2C, antenna 201 may be integrated along the perimeter of card frame 101. In some variations, card frame 101 comprises a flat metal sheet and the antenna 201 is insulated from the metal sheet. In further variations, the antenna 201 is exposed along the edge of the card frame or is not completely surrounded by the metal sheet, so that the metal sheet does not interfere with reception and transmission of radio frequency communications by the antenna 201.

The locations of magnetic strip 204, antenna 201, and electric circuit 205 are not limited to those locations illustrated in the figures and may be located anywhere in the perimeter of the card frame 101 illustrated in FIGS. 2A and 2B, and at any depth or on either surface of the card frame 101 illustrated in FIG. 2C.

As illustrated in FIGS. 2A-2C, in some variations transaction card 102, when secured in receptacle 103, may be substantially within the outer dimensions of card frame 101, such that card frame 101 and transaction card 102 together form card assembly 100 as a uniform piece that appears and functions as a traditional transaction card (e.g., credit card).

Computer chip 203 in transaction card 102 may be a smart chip or integrated circuit. In this regard, chip 203 may include a microprocessor and memory, such as read only memory (ROM) and/or random access memory (RAM). Additionally, chip 203 may include one or more contact pads (illustrated in FIG. 2A) to receive electric power to operate the transaction card 102 and exchange signals with a terminal, such as card reader 120. In some instances, the chip 203 may be configured to execute one or more applications. The applications may allow chip 203 to process payments. In other examples, the applications may allow the chip 203 to perform cryptographic processing, authentication, define risk management parameters (e.g., when the transaction may be conducted offline), digitally sign payment data, and/or verify the cardholder. When secured in the receptacle 103 of the card frame 101, the contact pads of chip 203 may be positioned to appear as contact pads for the card frame 101. In some variations, transaction card 102 may be configured to perform a first transaction (e.g., a data transaction via chip 203 and/or antenna 202 authenticated with a first set of credentials) when the transaction card 102 is not inserted into card frame 101, and perform a second transaction (e.g., a data transaction via chip 203 and/or antenna 201 authenticated with a second set of credentials) when the transaction card 102 is inserted into card frame 101.

Figure 2D:
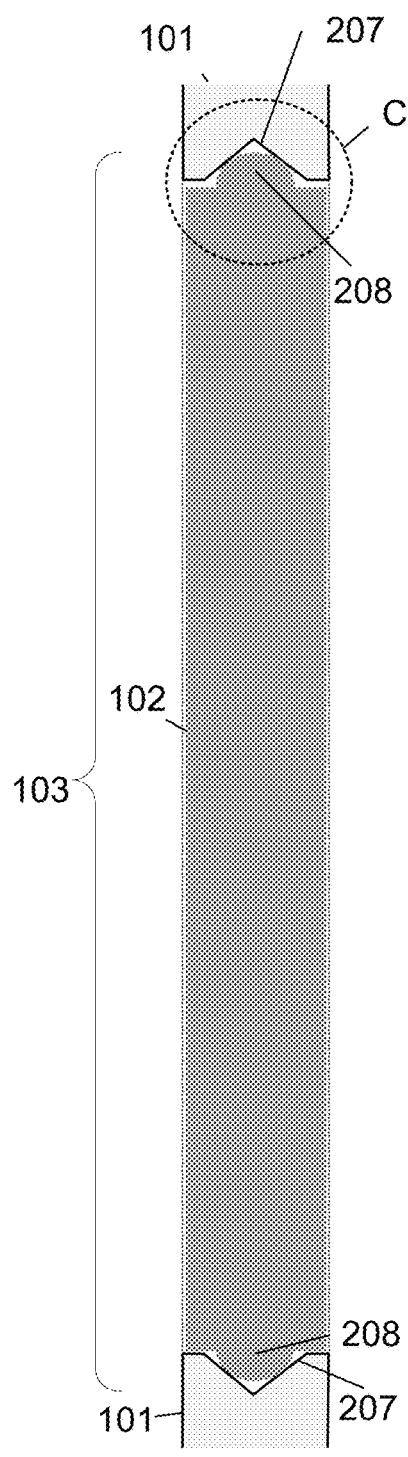
Figure 2E:
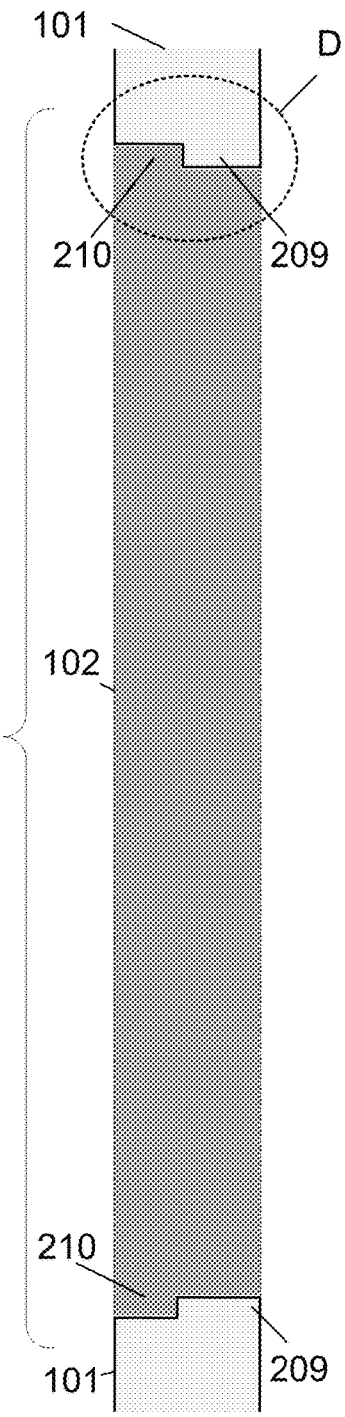
Figure 2F:
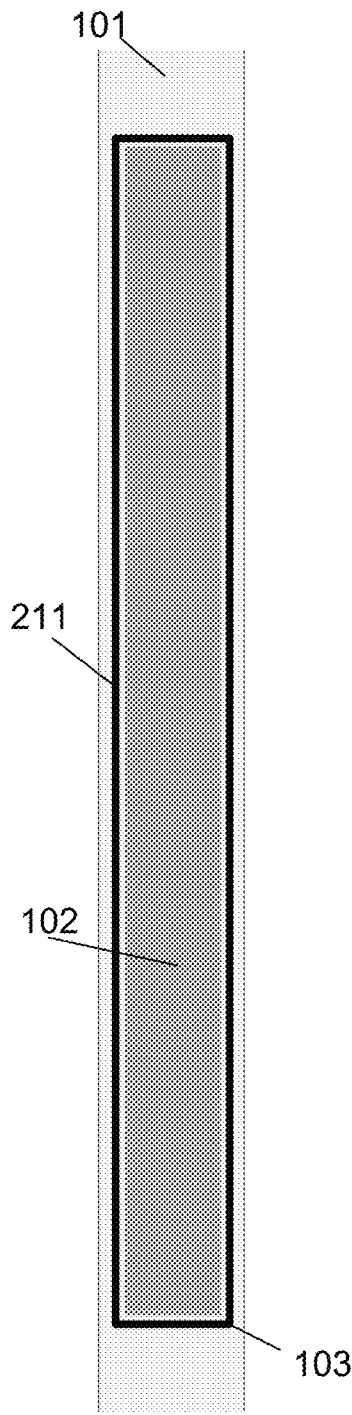

FIGS. 2D-2F illustrate various examples of view B of FIG. 2C to show in more detail the transaction card 102 inserted in receptacle 103. As illustrated in FIGS. 2D and 2E, card frame 101 may be a flat sheet comprising two opposing surfaces separated by a thickness and bounded by a perimeter (illustrated in FIGS. 1A and 1B), wherein the receptacle 103 comprises a hole passing completely through the thickness of the flat sheet. The receptacle 103 may have a perimeter (as illustrated in FIGS. 2A and 2B) that matches entirely, or only at some edges of, the perimeter of the transaction card 102. As illustrated in FIG. 2D, the transaction card 102 and receptacle 103 may have an interference fit in which the profile of the transaction card 102 has a protrusion 208, which fits within a groove 207 of the receptacle 103 to secure the transaction card 102 in the card frame 101. The material of the protrusion 208 and/or the walls of the groove 207 may be flexible to allow the transaction card 102 to be secured, removed, and resecured in the receptacle 103 with the application of opposing forces perpendicular to the faces of the card frame 101 and transaction card 102 respectively, for example, to snap the transaction card 102 into the receptacle 103. While protrusion 208 is illustrated as curved and groove 2007 is illustrated in the shape of a "v," these may be of any profile that provides an interference fit. Additionally, the profiles may be reversed so that the perimeter of the transaction card 102 has a groove, and the receptacle 103 has a protrusion.

FIG. 2E illustrates another example, in which the perimeters of the receptacle 103 and transaction card 102 have mating rims 210 and 209 respectively with mirrored profiles. In some variations, the transaction card 102 may be inserted from only one side of the card frame 101. The transaction card 102 may be secured in the receptacle 103 by friction between the perimeters of the transaction card 102 and receptacle 103. In other variations, the transaction card 102 may be magnetically coupled to the receptacle 103 and/or card frame 101 to secure, enable removal of, and resecure the transaction card 102 in the card frame 101. Each of these configurations can be used together, for example by some edges of the transaction card 102 being secured with a groove/protrusion, and some with mirrored rims that are coupled magnetically. Transaction card 102 may be configured to detect whether it is inserted in the card frame 101, and based on this detection, perform different operations (e.g., perform different types of data transactions or take on different identities).

While FIGS. 2D and 2E illustrate the receptacle 103 as a hole passing completely through the flat sheet of the card frame, in other variations, the receptacle 103 may be a recess in one of the two opposing surfaces with the other surface being completely or partially closed.

FIG. 2F illustrates another variation of receptacle 103 comprising a slot 211 having an open end, along the perimeter between the two opposing surfaces of the card frame 101, through which the receptacle 103 is configured to secure, enable the removal of, and resecure the transaction card 102.

In some variations, the card frame 101 and/or receptacle 103 may provide an electromagnetic shield preventing the antenna 202 in the transaction card 102 from receiving or transmitting radio frequency signals while the transaction card 102 is secured in the receptacle 103. For example, in the receptacle 103 in FIG. 2F, one or both surfaces of the card frame 101 may be coated or made of a conductive material (e.g., aluminum, stainless steel, titanium), which covers the transaction card 102 partially or completely. In this way, the card frame 101 may disable the transaction card antenna 202 while the transaction card 102 is secured in the receptacle 103, thus preventing both antennas 201 and 202 from relaying data transactions simultaneously. Alternatively or additionally, transaction card 102 may disable its antenna 202 based on detecting that the transaction card 102 is secured in the receptacle 103.

Figure 2G:
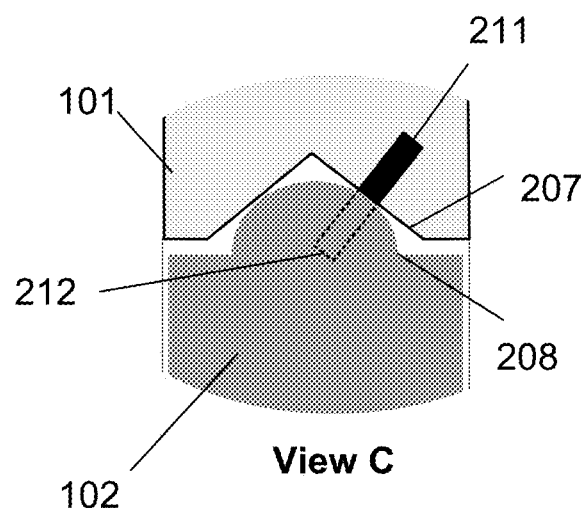
Figure 2H:
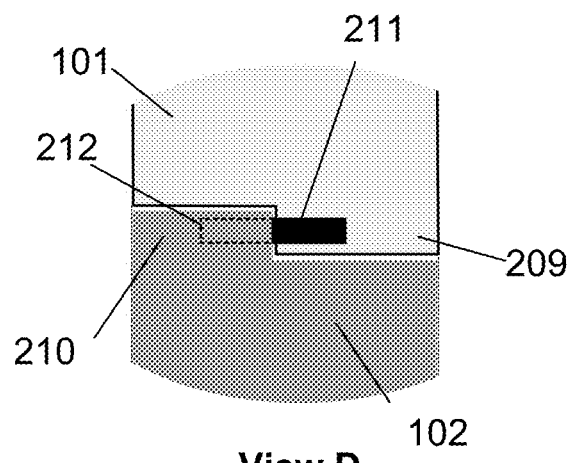

As previously discussed, when transaction card 102 is secured in receptacle 103, it may be interfaced to antenna 201 in the card frame 101 via electric circuit 205. FIGS. 2G-2H illustrate views C and D of FIGS. 2D-2E, respectively, which illustrate details of electrical contacts for electrically coupling transaction card 102 to electric circuit 205. As illustrated in these figures, card frame 101 may include one or more electrical contacts 211 along the perimeter of the receptacle 103 that contact a corresponding one or more electrical contacts 212 on the perimeter of the transaction card 102 when the transaction card 102 is secured in the receptacle 103. In FIG. 2G, contacts 211 and 212 are illustrated on the mating protrusion 208 and groove 207, respectively, but the contact coupling can be positioned at any location at which the transaction card 102 comes into contact with the card frame 101 so that contacts 211 and 212 touch. Similarly, in FIG. 2H, contacts 211 and 212 are illustrated on the first rim of card frame 101 and mating second rim of transaction card 102, respectively, but the contact coupling can be positioned at any location at which the transaction card 102 comes into contact with the card frame 101 so that contacts 211 and 212 touch. For example, if the receptacle 103 is a recess or a slot, the card frame 101 may have contacts on the bottom surface of the recess or inside surface of the slot, which contact corresponding contacts on a surface of the transaction card 102.

Figure 3A:
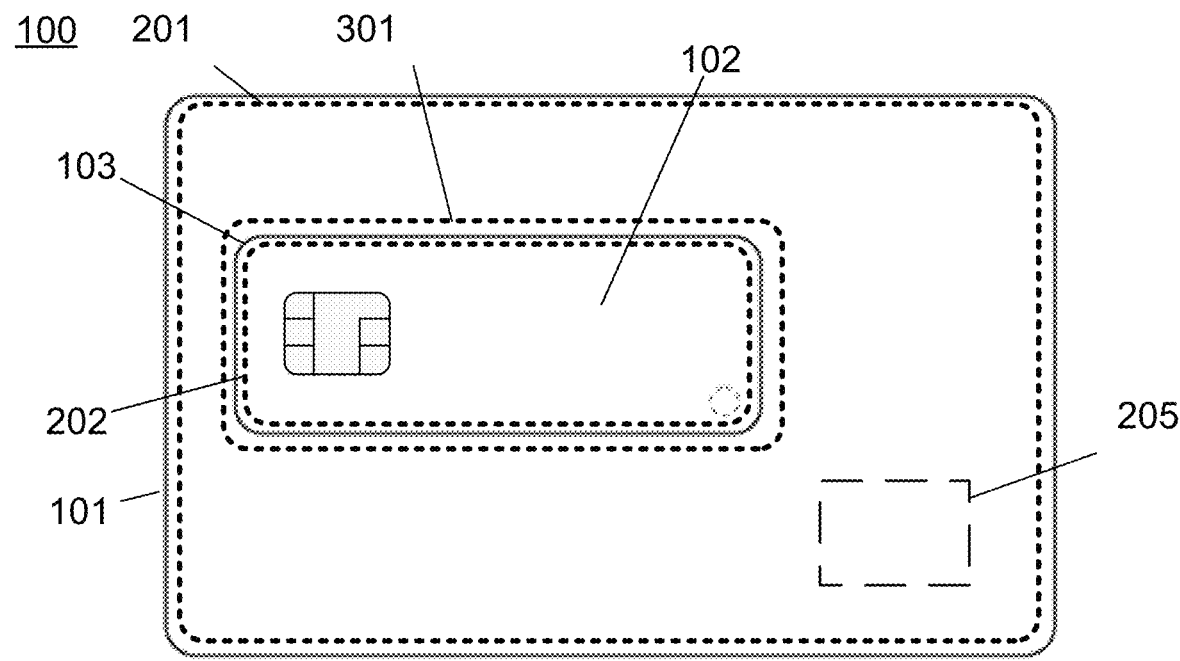
Figure 3B:
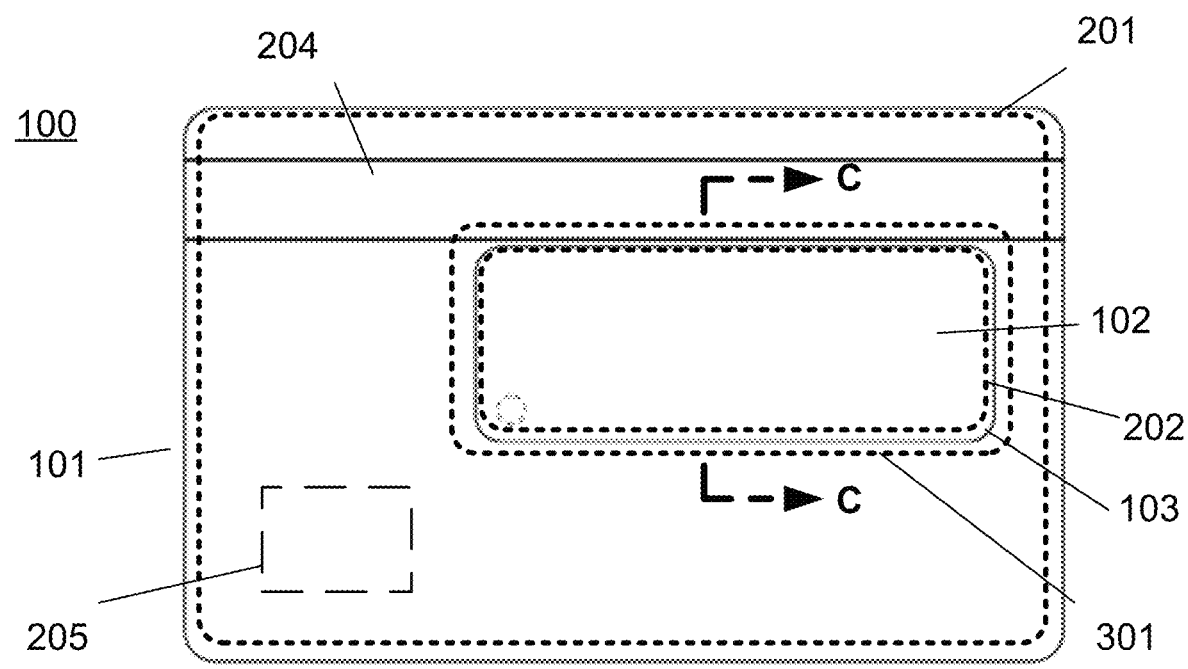

FIGS. 3A-3D illustrate different views of another variation of card assembly 100, in which card frame 101 communicates with transaction card 102 wirelessly (e.g., without using contacts 211 and 212). FIG. 3A illustrates a front view, FIG. 3B illustrates a back view, and FIGS. 3C and 3D illustrate cross-section views C-C of receptacle 300. As illustrated in these figures, card frame 101 includes an additional antenna 301 proximate to the receptacle 103. For example, as illustrated in FIGS. 3A, 3B, and 3C, antenna 301 may be embedded in the card frame 101 and may encircle the perimeter of the receptacle 103, and thus encircle antenna 202 when the transaction card 102 is secured in the receptacle 103. In other variations, for example when the receptacle 103 comprises a recess or a slot as illustrated in FIG. 3D, antenna 301 may be embedded in or on the surface of the wall of the slot or on the bottom of a recess. In this assembly, transaction card 102 and card frame 101 exchange data via radio frequency communication between antennas 202 and 301, which may include implementing a wireless protocol (e.g., NFC, Wi-Fi, Bluetooth®, and/or Bluetooth Low Energy (BLE)). In some variations, antennas 301 and 202 provide inductive power transfer between card frame 101 and transaction card 102. In some variations the card frame 101 includes both electrical contacts 211 and antenna 301, which may alternatively be used, or used in combination, depending upon whether the transaction card 102 has corresponding features and capabilities (e.g., contacts 212 and antenna 202).

Transaction card 102 may be coupled to antenna 201 in the card frame by electric circuit 205 via the electrical contacts 211 and 212 or by the electromagnetically coupled antennas 202 and 301. In one variation, electric circuit 205 may comprise wire conductors and (optionally) passive components (e.g., capacitors, resistors, inductors) that electrically (e.g., directly or capacitively) connect antenna 201 to contacts 211 and/or antenna 301.

Figure 4:
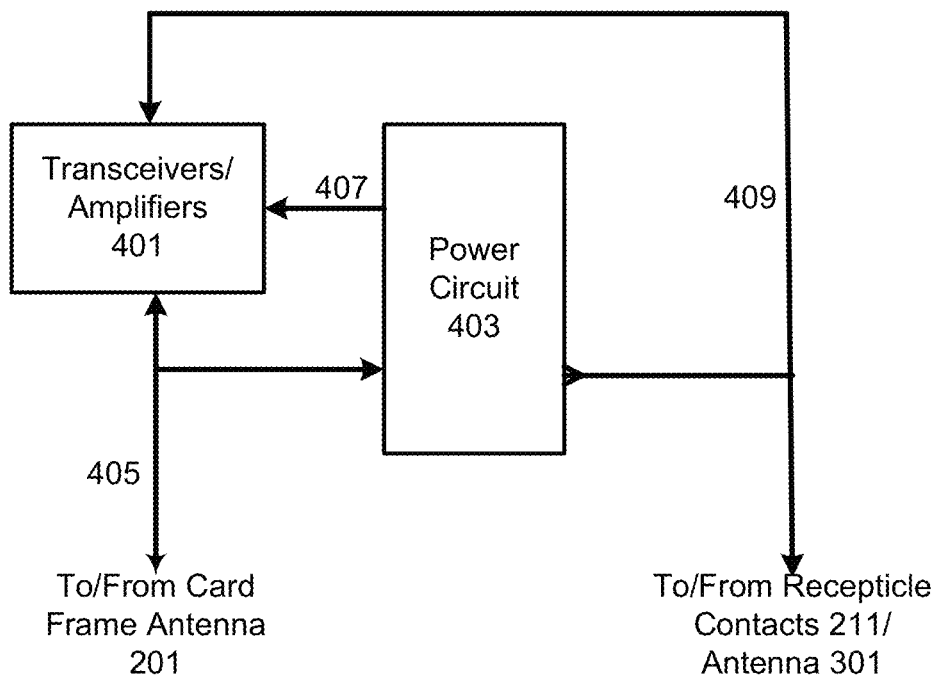
FIG. 4 illustrates a block diagram of an electrical circuit according to one or more aspects of the disclosure.

FIG. 4 illustrates circuit 400, which is another variation of electric circuit 205. Circuit 400 may include one or more conductors 405 that are connected between antenna 201 and transceivers and/or amplifiers 401 in card frame 101. Antenna 201 may receive and radiate radio frequency signals, which correspond to signals carried on the one or more conductors 405 to and from transceivers and/or amplifiers 401. Similarly, one or more conductors 409 are connected and carry electrical signals between contacts 211 or antenna 301 and transceivers and/or amplifiers 401. The transceivers and/or amplifiers 401 condition the signals, for example by amplifying and filtering them, and exchange the conditioned signals between conductors 405 and 409 to provide a complete communication path for data carried in the signals between the antenna 201 in the card frame and the transaction card 102 in the receptacle 103.

For example, the electric circuit 400 may be configured to receive, via contacts 211 and conductors 409, a first signal comprising transmission data from the transaction card 102 (through contacts 212), amplify the first signal with transceivers and/or amplifiers 401 to generate an amplified first signal, and transmit wirelessly the amplified first signal including the transmission data via conductors 405 and antenna 201. Similarly, the electric circuit 400 may be configured to receive wirelessly, via antenna 201 and conductors 405, a second signal comprising reception data, amplify the second signal to generate an amplified second signal with transceivers and/or amplifiers 401; and transmit the amplified second signal including the reception data, to the transaction card 102 via conductors 409 and contacts 211. This relaying of data between the antenna 201 in the card frame 101 and the transaction card 102 in the receptacle 103, and wirelessly transceiving the data between the antenna 201 and a terminal may be used to perform a contactless data transaction between the transaction card 102 and a terminal. In some variations, transceivers and/or amplifiers 401 may include communication protocol capabilities, such as NFC, Wi-Fi, Bluetooth®, and/or BLE.

Electric circuit 400 may further include a power circuit 403, which is configured to generate electric power from signals from antenna 201 in the card frame 101. For example, radio frequency electromagnetic energy (e.g., radio frequency wireless signals) may be received by antenna 201 and conducted along conductors 405 to power circuit 403. These may be the same or different signals that carry data and are conditioned and amplified by transceivers/amplifiers 401. Power circuit 403 may include a power converter (for example, comprising a capacitor and a diode) that converts the radio frequency signals to electrical power (e.g., alternating current or direct current power). The generated electrical power may be provided via conductors 407 to energize the electrical circuits within the transceivers and/or amplifiers 401. The electrical power may additionally or alternatively be provided via conductors 409 to contacts 211 and 212 to the transaction card 102. In some variations, the electrical power is converted back to radio-frequency signals and transmitted via antenna 301 to the transaction card 102, which may be configured to receive these signals via antenna 202 and convert them to electrical power internally in the transaction card 102 (e.g., inductive charging).

Figure 5:
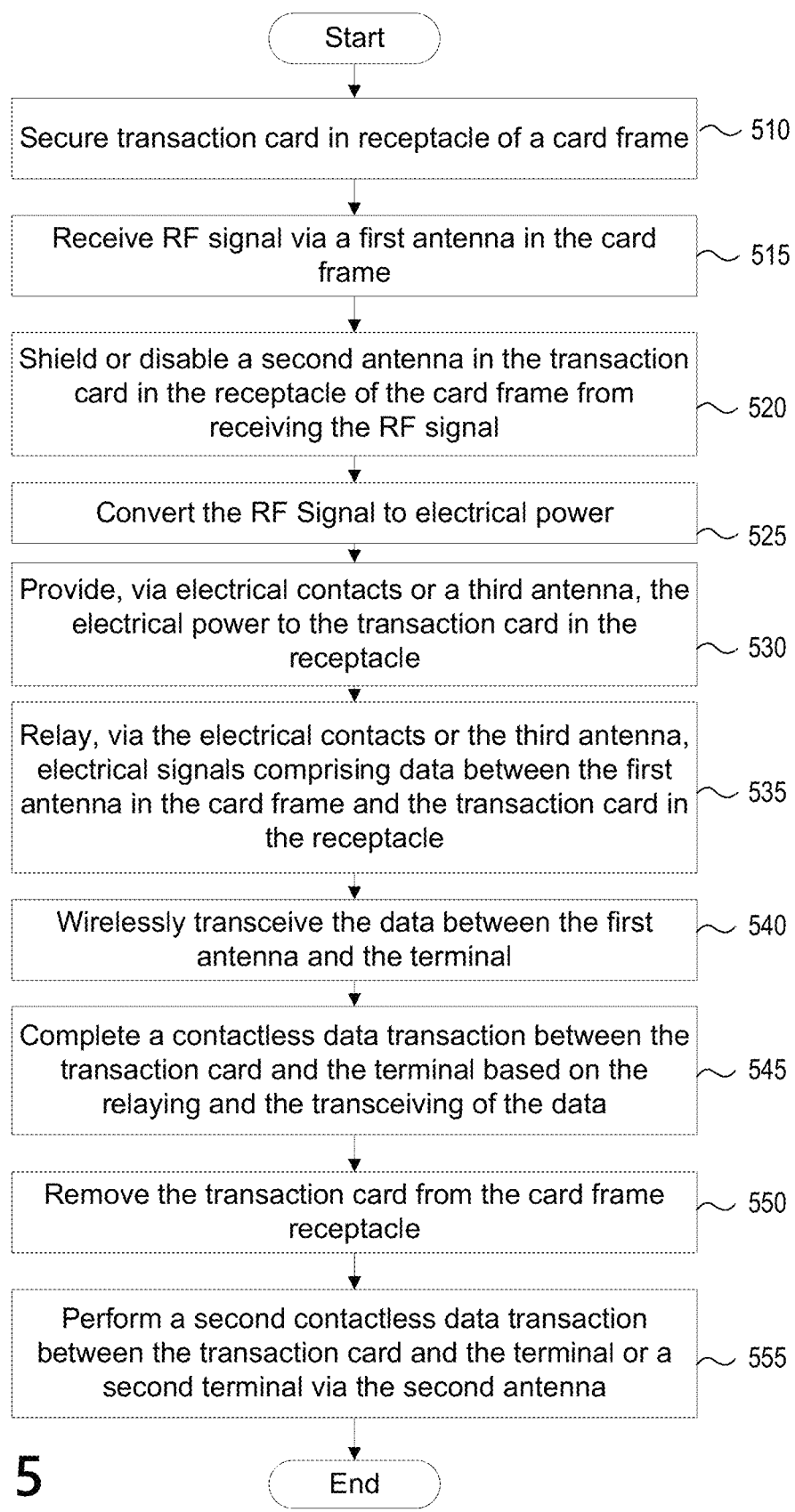
FIG. 5 illustrates a first example method for using a transaction card assembly to perform a data transaction according to one or more aspects of the disclosure.

FIG. 5 illustrates an example method 500 for using the transaction card 102 with and optionally without card frame 101. In step 510, transaction card 102 may be secured in receptacle 103 of card frame 101 as described above (e.g., with an interference fit or magnetic coupling). In step 515, radio frequency electromagnetic energy (e.g., a wireless radio frequency signal) may be received via antenna 201.

In step 520, second antenna 202 in the transaction card 102 is disabled from receiving radio frequency signals from outside of the card frame 101. In some examples, this prevents the card assembly 100 (101 and 102 together) from performing or attempting to perform multiple transactions with a card reader (e.g., a point-of-sale terminal), by for example, receiving radio frequency transmission on both antenna 201 and 202. In some variations (for example, as shown in FIG. 2F and described above), antenna 202 is disabled by the card frame 101 by providing an electromagnetic shield around the antenna 202. In other variations, the transaction card 102 detects that it is secured in the receptacle 102, and based on this detection, disables the antenna 202 internally in the transaction card 102.

In step 525, the card frame 101 converts the received radio frequency signals into electrical power (e.g., direct-current or alternating-current power), and in step 530, the electrical power is provided via electrical contacts 211/212 or antennas 301 and 202 (via inductive coupling) to the transaction card 102 in the receptacle 103 as discussed above.

In step 535, the card frame 101 may relay, via the electrical contacts 211 and 212 or antennas 301 and 202, electrical signals comprising data between antenna 201 in the card frame 101 and the transaction card 102 in the receptacle 103. This may be performed by electric circuit 400 as previously discussed, or by computing device 700, which is further described below with respect to FIG. 7. In step 540, card frame 101 may wirelessly transceive this data to and from a card reader 120 (e.g., a terminal). The transceiving may include radiating and/or receiving the data in radio frequency signals from antenna 201. In step 545, the card assembly 100 completes a contactless data transaction between the transaction card 102 and the terminal based on the relaying and the transceiving of the data.

In step 550, the transaction card 102 is removed from the card frame receptacle 103, as previously described above. Once removed, in step 550, the transaction card 102 may perform a second contactless data transaction with the card reader (or a different card reader) (e.g., terminal) using its antenna 202. The steps of process 500 may be performed in other orders and all steps need not be performed.

Figure 6:
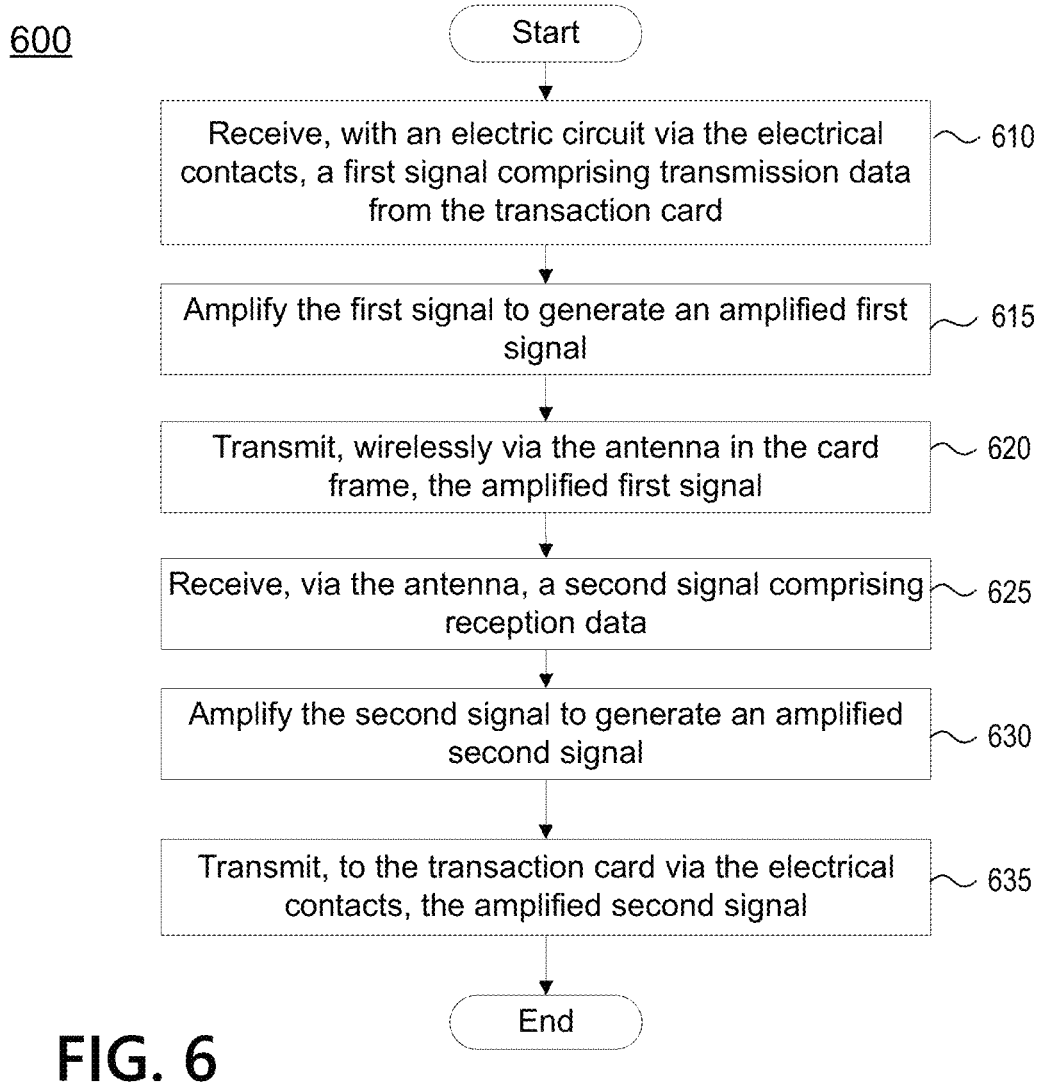
FIG. 6 illustrates a second example method for using a transaction card assembly to perform a data transaction according to one or more aspects of the disclosure.

FIG. 6 illustrates a method 600 for card frame 101, for example using electric circuit 400, to relay and transceive data. In step 610, the card frame 101 may receive (for example via the electrical contacts 211 or antenna 301) a first signal comprising transmission data from the transaction card 102. In step 615, the card frame 101 may amplify (for example using transceivers and/or amplifiers 401) the first signal to generate an amplified first signal. In step 620, the card frame 101 may transmit, wirelessly via antenna 201, the amplified first signal, for example to a card reader 120. In step 625, the card frame 101 may receive, via antenna 201, a second signal comprising reception data, and in step 630, the card frame 101 may amplify (for example using transceivers and/or amplifiers 401) the second signal to generate an amplified second signal. In step 635 the card frame 101 may transmit (for example via the electrical contacts 211 or antenna 301) the amplified second signal to the transaction card 102. The transmission of the first signal comprising transmission data and the reception of the second signal comprising reception data may be performed in any order and may be related, with one being based on, or in response to, the other, and with both part of a contactless data transaction (e.g., a credit card transaction). Processes 500 and 600 may be performed separately or together.

In some variations of card frame 101, electric circuit 205 includes a processing circuit for implementing a smart card frame. For example, electric circuit 205 may comprise computing device 700 as illustrated in FIG. 7. Computing device 700 may include a processor 703 for controlling overall operation of the computing device 700 and its associated components, input/output device 709, memory 715, and/or communication interface 723. A data bus may interconnect processor(s) 703, memory 715, I/O device 709, and/or communication interface 723.

Input/output (I/O) device 709 may include a port (e.g., contacts, conductors, modem) through which the computing device 700 may receive input, such as for initial programming, receiving authentication keys, etc., prior to being issued to a cardholder.

Software may be stored within memory 715 to provide instructions to processor 703 allowing computing device 700 to perform various actions. For example, memory 715 may store software used by the computing device 700, such as an operating system 717, application programs 719, and/or an associated internal database 721. The various hardware memory units in memory 715 may include volatile and nonvolatile media implemented in any method or technology for storage of information such as computer-readable instructions, data structures, program modules, or other data. Memory 715 may include one or more physical persistent memory devices and/or one or more non-persistent memory devices. Memory 715 may include, but is not limited to, RAM, ROM, electronically erasable programmable read only memory (EEPROM), flash memory or other memory technology that may store information and that may be accessed by processor 703.

Communication interface 723 may include one or more transceivers, amplifiers, digital signal processors, and/or additional circuitry and software for communicating via antennas 201 and/or 301 and/or contacts 211. Communication interface 723 may also include near field communication (NFC) capabilities, short-range wireless communication capabilities (e.g., Bluetooth®), wireless communication capabilities (e.g., Wi-Fi), or any combination thereof. Communication interface 723 may include some or all of the features of electric circuit 400 illustrated in FIG. 4.

Computing device 700 may further include a power circuit 730, which may be the same as power circuit 403 described with respect to FIG. 4 for converting radio frequency electromagnetic signals to electrical power for powering computing device 700 and transaction card 102 as previously described.

Processor 703 may include a single central processing unit (CPU), which may be a single-core or multi-core processor, or may include multiple CPUs. Processor(s) 703 and associated components may allow the computing device 700 to execute a series of computer-readable instructions to perform some or all of the processes described herein. Although not illustrated in FIG. 7, various elements within memory 715 or other components in computing device 700, may include one or more caches, for example, CPU caches used by the processor 703, page caches used by the operating system 717, and/or database caches used to cache content from database 721. For embodiments including a CPU cache, the CPU cache may be used by one or more processors 703 to reduce memory latency and access time. A processor 703 may retrieve data from or write data to the CPU cache rather than reading/writing to memory 715, which may improve the speed of these operations.

Although various components of computing device 700 are described separately, functionality of the various components may be combined and/or performed by a single component and/or multiple computing devices in communication. And although various components of computing device 700 are described separately from the various components of electric circuit 400, these various components and their functionality may be combined and/or performed by a single component and/or multiple computing devices in communication.

The inclusion of a processing circuit, such as computing device 700, greatly expands the capabilities of card frame 101, such as: enabling it to work as a transaction card on its own (without transaction card 102 secured in the receptacle), providing security measures limiting the use of the card frame to only certain paired transaction cards 102, and enabling the card frame to take on multiple different identities, depending upon whether a transaction card is inserted in the receptacle and depending upon which of multiple different transaction cards is inserted into the receptacle.

Figure 8:
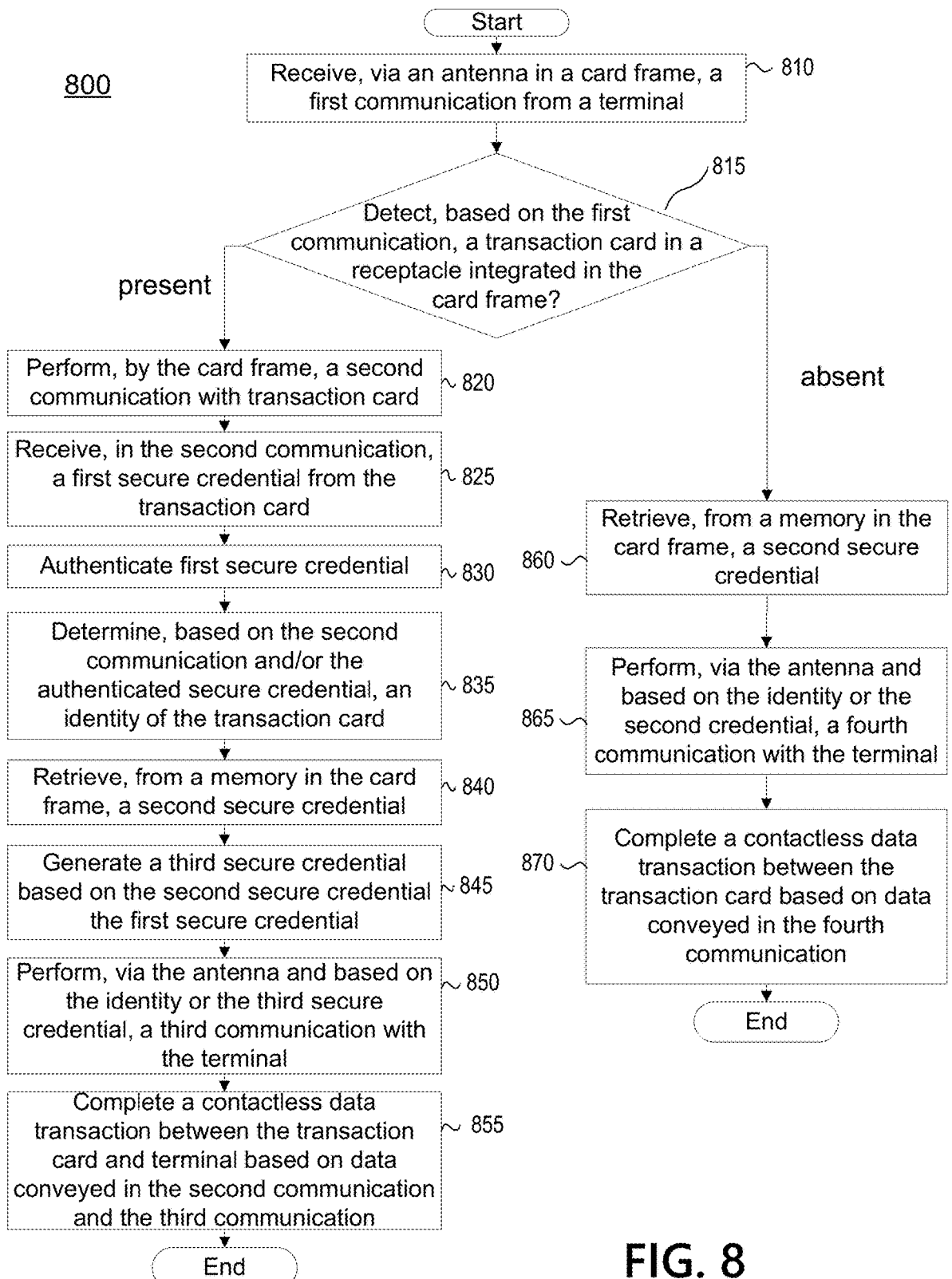
FIG. 8 illustrates a flow chart of a process for using a transaction card assembly to perform a data transaction according to one or more aspects of the disclosure.

FIG. 8 illustrates a method 800 for using the card frame 101 that includes a processing circuit, such as computing device 700. Process 800 begins with step 810, in which the card frame 101 receives, via antenna 201, a first communication from a terminal, such as card reader 120. The first communication may communicate data (in either or both directions) and be the beginning or part of a data transaction (e.g., a contactless transaction, NFC transaction) with the terminal. In step 815 the card frame 101 detects, based on the first communication, whether a transaction card 102 is secured in receptacle 103. The detection may, for example, be based on a communication between the transaction card 102 and computer device 700, or may be based on a measurement of an electrical parameter (e.g., detection of a resistance at contacts 211). In response to detecting that the transaction card 102 is present in the receptacle 103, steps 820-855 may be performed to complete a contactless data transaction based on the combination of card frame 101 and transaction card 102 together as card assembly 100. In response to detecting that the transaction card 102 is absent from the receptacle 103, steps 860-875 may be performed to complete a contactless data transaction based on the card frame 101 alone.

If transaction card 102 is present in the receptacle 103, card frame 101 in step 820, performs a second communication with transaction card 102. The second communication may convey data (in either or both directions) for performing the data transaction with the terminal. The card frame 101 may in step 825 receive in the second communication, a first secure credential from transaction card 102, which may be unique to transaction card 102, and may in step 830 authenticate the first secure credential, for example, using a decryption and/or authentication application executed in computing device 700. In step 835, the card frame 101 (for example, using computing device 700) may determine, based on the second communication and/or the authenticated secure credential, an identity of transaction card 102.

In step 840 the computing device 700 may (optionally) retrieve from a memory (e.g., 715) in the card frame 101, a second secure credential uniquely associated with the card frame 101. Performance of step 840 may be based on confirming that the identity or authenticated secure credential of the transaction card 102 is authorized to be used with the card frame 101. For example, computing device 700 may have stored in memory, a list of one or more identities of different transaction cards authorized to be used with the card frame 101. If the transaction card 102 is not authorized to be used with the card frame 101 (e.g., because transaction card 102 is not in the list), the process may end without completing the data transaction.

In step 845 computing device 700 in the card frame 101 may generate a third secure credential based on the first secure credential and (optionally) based on the second secure credential. The third secure credential may be unique to the combination of the card frame 101 and transaction card 102 (for example, by being derived from the first and second secure credentials). Computing device 700 may be configured to generate multiple different third secure credentials based on the second secure credential and, respectively, multiple different first secure credentials of multiple different transaction cards 102.

In step 850 card frame 101 may perform, via antenna 201 and based on the identity of the transaction card 102 in the receptacle or based the third secure credential, a third communication with the terminal. The performance of steps 845 and/or 850 may be based on or in response to the successful authentication of the first secure credential. The third communication may contain data conveyed in the second communication and additional data (e.g., the third secure credential). In step 855 the card frame 101 may complete a contactless data transaction between the transaction card 102 in the receptacle and the terminal based on data conveyed in the second communication and the third communication. In each of the communications, the data may be conveyed (in either or both directions) and (optionally) encrypted, with computing device 700 performing encryption and decryption of the data.

Returning to step 815, if the transaction card 102 was determined to be absent from the receptacle 103 integrated in the card frame 101, step 860 may be performed in which the card frame 101 retrieves from the memory in the card frame 101, the second secure credential as described above with respect to step 840. In step 865 card frame 101 may perform, via antenna 201 and based on the second secure credential, a fourth communication with the terminal. In this step, the second secure credential is uniquely associated with just the card frame 101 and is distinct from the secure credentials of the transaction cards 102. In step 875 card frame 101 completes a data transaction (e.g., contactless data transaction, NFC transaction) between the card frame 101 and the terminal based on data conveyed (in either or both directions) in the fourth communication. In the fourth communication, the data may be encrypted, with computing device 700 performing encryption and decryption of the data.

With the steps of process 800, the card frame 101 may appear as multiple different transaction cards when performing contactless data transactions, each with a unique identity, that is specific to the card frame 101 alone (with the receptacle 103 empty), or specific to the unique combinations of the card frame 101 and each different transaction card 102 inserted in the receptacle. Moreover, the transaction cards 102 also appear unique with their own respective identities when performing a data transaction without the card frame.

One or more aspects discussed herein may be embodied in computer-usable or readable data and/or computer-executable instructions, such as in one or more program modules, executed by one or more computers or other devices as described herein. Generally, program modules include routines, programs, objects, components, and data structures that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described. Thus, embodiments of the present disclosure should be considered in all respects as illustrative and not restrictive.

The invention claimed is:

1. A card frame for performing a data transaction between a transaction card and a terminal, the card frame comprising:
   a flat sheet;
   a receptacle integrated in the flat sheet and configured to secure the transaction card in the card frame;
   an antenna integrated in the flat sheet; and
   a processor circuit integrated in the flat sheet, wherein the processor circuit is configured to:
      receive a credential from the transaction card;
      authenticate the transaction card based on the credential;
      perform a first communication between the card frame and the terminal; and
      perform, via the antenna, a second communication between the card frame and the transaction card when the transaction card is secured in the receptacle, wherein the first communication and the second communication convey data to perform the data transaction between the transaction card and the terminal.

2. The card frame of claim 1, wherein the processor circuit is configured to perform the second communication based on authentication of the credential.

3. The card frame of claim 1, further comprising a memory, wherein the processor circuit is configured to:
   retrieve, from the memory, a second credential; and
   generate a third credential based on the credential and the second credential, wherein the third credential is sent to the terminal via the first communication.

4. The card frame of claim 1, further comprising an electromagnetic shield configured to prevent wireless communication directly between the terminal and the transaction card when the transaction card is secured in the receptacle.

5. The card frame of claim 1, further comprising a power circuit configured to power the transaction card via the antenna.

6. The card frame of claim 1, further comprising a second antenna, wherein the processor circuit is configured to perform the first communication wirelessly via the second antenna.

7. The card frame of claim 6, further comprising a power circuit configured to receive power via the second antenna and to provide the power to the transaction card via the antenna.

8. The card frame of claim 1, wherein the processor circuit is configured to:
   detect that the transaction card is not secured in the receptacle; and
   perform, via a third communication, a second data transaction between the card frame and the terminal based on detecting that the transaction card is not secured in the receptacle.

9. The card frame of claim 1, further comprising a memory, wherein:
   the receptacle is configured to secure a second transaction card in the card frame; and
   the processor circuit is configured to:
      receive, via the antenna, a first credential from the transaction card when the transaction card is secured in the receptacle;
      receive, via the antenna, a second credential from the second transaction card when the second transaction card is secured in the receptacle;
      retrieve, from the memory, a third credential;
      generate a fourth credential based on the first and the third credentials, wherein the fourth credential is sent to the terminal via the first communication;
      generate a fifth credential based on the second and the third credentials; and
      perform a third communication between the card frame and the terminal, wherein the fifth credential is sent to the terminal via the third communication.

10. A card frame for performing a data transaction with a terminal, the card frame comprising:
    a receptacle;
    a first antenna configured to wirelessly convey information between the card frame and a transaction card secured in the receptacle;
    a second antenna configured to communicate with the terminal; and
    a processor circuit configured to perform the data transaction, via the second antenna, with the terminal based on the information.

11. The card frame of claim 10, further comprising a power circuit configured to:
    convert radio frequency power received via the second antenna to direct-current power;
    supply the direct-current power to the processor circuit; and
    provide power, via the antenna, to the transaction card.

12. The card frame of claim 10, further comprising a flat sheet, wherein the receptacle, the first antenna, and the processor circuit are integrated in the flat sheet.

13. The card frame of claim 10, wherein:
    the receptacle is configured to secure a second transaction card;
    the first antenna is configured to wirelessly convey additional information between the card frame and the second transaction card; and
    the processor circuit is configured to perform a second data transaction with the terminal based on the additional information.

14. The card frame of claim 10, wherein the processor circuit is configured to generate a plurality of credentials, each credential of the plurality of credentials being unique to a combination of the card frame and each of a plurality of transaction cards, respectively.

15. The card frame of claim 10, further comprising a power circuit configured to power the transaction card via the first antenna.

16. A card frame for performing a data transaction with a terminal, the card frame comprising:
   a receptacle;
   an antenna configured to wirelessly convey information between the card frame and a transaction card secured in the receptacle; and
   a processor circuit configured to:
      authenticate a credential received in the information; and
      perform the data transaction with the terminal based on authentication of the credential.

17. The card frame of claim 16, further comprising:
   a second antenna configured to communicate with the terminal,
   wherein the processor circuit is configured to perform the data transaction via the second antenna.

18. The card frame of claim 17, further comprising a power circuit configured to:
   convert radio frequency power received via the second antenna to direct-current power;
   supply the direct-current power to the processor circuit; and
   provide power, via the antenna, to the transaction card.

19. The card frame of claim 16, further comprising a flat sheet, wherein the receptacle, the antenna, and the processor circuit are integrated in the flat sheet.

20. The card frame of claim 16, further comprising a power circuit configured to power the transaction card via the antenna.

* * * * *